United States Patent
Takeda et al.

(10) Patent No.: US 12,069,624 B2
(45) Date of Patent: Aug. 20, 2024

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 94 days.

(21) Appl. No.: 16/346,787

(22) PCT Filed: Nov. 1, 2017

(86) PCT No.: PCT/JP2017/039621
§ 371 (c)(1),
(2) Date: May 1, 2019

(87) PCT Pub. No.: WO2018/084206
PCT Pub. Date: May 11, 2018

(65) Prior Publication Data
US 2019/0261364 A1    Aug. 22, 2019

(30) Foreign Application Priority Data
Nov. 2, 2016    (JP) .................. 2016-215715

(51) Int. Cl.
*H04W 72/04*    (2023.01)
*H04L 27/26*    (2006.01)
(Continued)

(52) U.S. Cl.
CPC ......... *H04W 72/0446* (2013.01); *H04L 27/26* (2013.01); *H04W 72/02* (2013.01); *H04W 72/04* (2013.01); *H04W 88/02* (2013.01)

(58) Field of Classification Search
CPC . H04W 72/0446; H04W 72/02; H04W 72/04; H04W 88/02; H04L 27/26
See application file for complete search history.

(56) References Cited

U.S. PATENT DOCUMENTS 8,107,565 B2 *  1/2012  Li .................. H03G 3/3078
                                                375/345
8,199,712 B2 *  6/2012  Qu .................. H04L 5/0037
                                                370/329
(Continued)

FOREIGN PATENT DOCUMENTS

WO    WO-2014139562 A1 *  9/2014  ......... H04L 27/2601

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Bailor C Hsu
(74) *Attorney, Agent, or Firm* — Osha Bergman Watanabe & Burton LLP

(57) ABSTRACT

To configure proper time intervals to meet various communication requirements in radio communication systems, and perform various types of processing in the time interval, a user terminal is provided with a transmitting/receiving section that receives numerology information on numerology, and a control section that controls transmission of an uplink signal and/or reception of a downlink signal, according to a basic time unit determined based on configuration information including the numerology information.

5 Claims, 19 Drawing Sheets

(51) Int. Cl.
  *H04W 72/02* (2009.01)
  *H04W 72/0446* (2023.01)
  *H04W 88/02* (2009.01)

(56) References Cited

U.S. PATENT DOCUMENTS

| | | | | |
|---|---|---|---|---|
| 8,514,830 | B2* | 8/2013 | Lim | H04L 27/2607 370/344 |
| 10,645,631 | B2* | 5/2020 | Gupta | H04W 74/08 |
| 10,687,252 | B2* | 6/2020 | Manolakos | H04L 5/0007 |
| 10,701,710 | B2* | 6/2020 | Lin | H04W 52/247 |
| 2008/0043866 | A1* | 2/2008 | Mujtaba | H04L 27/2628 375/260 |
| 2010/0266057 | A1* | 10/2010 | Shrivastava | H04L 5/0091 375/260 |
| 2016/0337916 | A1* | 11/2016 | Deenoo | H04W 36/0094 |
| 2016/0352551 | A1* | 12/2016 | Zhang | H04L 27/2646 |
| 2017/0111930 | A1* | 4/2017 | Rajagopal | H04W 74/006 |
| 2017/0156140 | A1* | 6/2017 | Islam | H04W 72/0446 |
| 2017/0201968 | A1* | 7/2017 | Nam | H04W 72/0446 |
| 2017/0289882 | A1* | 10/2017 | Faccin | H04W 36/0022 |
| 2017/0332359 | A1* | 11/2017 | Tsai | H04B 7/0617 |
| 2017/0332396 | A1* | 11/2017 | Liao | H04W 72/0446 |
| 2018/0035421 | A1* | 2/2018 | Lin | H04W 74/0833 |
| 2018/0049227 | A1* | 2/2018 | Moon | H04W 72/0446 |
| 2018/0070341 | A1* | 3/2018 | Islam | H04L 5/0064 |
| 2018/0092064 | A1* | 3/2018 | Ryu | H04W 56/001 |
| 2018/0092084 | A1* | 3/2018 | Yun | H04L 5/0007 |
| 2018/0234227 | A1* | 8/2018 | Zhang | H04L 27/26 |
| 2019/0082431 | A1* | 3/2019 | Yi | H04L 5/0057 |
| 2022/0360361 | A1* | 11/2022 | Saggar | H04W 52/18 |
| 2022/0399930 | A1* | 12/2022 | Saggar | H04W 16/28 |

OTHER PUBLICATIONS

Panasonic; "Use of multiple numerologies in NR"; 3GPP TSG RAN WG1 Meeting #86 R1-167439; Gothenburg, Sweden, Aug. 22-26, 2016 (9 pages).

ETRI; "Numerology design and link-level simulation results for high-speed scenario"; 3GPP TSG RAN WG1 Meeting #86bis R1-1610426; Lisbon, Portugal, Oct. 10-14, 2016 (9 pages).

Huawei, HiSilicon; "Discussion on UE behavior on mixed numerology carrier"; 3GPP TSG RAN WG1 Meeting #86bis R1-1609425; Lisbon, Portugal, Oct. 10-14, 2016 (4 pages).

Written Opinion issued for PCT/JP2017/039621, mailed Jan. 23, 2018 (4 pages).

International Search Report issued for PCT/JP2017/039621, mailed Jan. 23, 2018 (5 pages).

Extended European Search Report issued in Application No. 17867435.4, mailed on May 27, 2020 (7 pages).

3GPP TSG RA WG1 Meeting #84bis; R1-162931; "Frame Structure and Numerology for New RAT;" Cohere Technologies, Telefonica, Telstra; Apr. 11-15, 2016; Busan, South Korea (4 pages).

3GPP TSG RAN1 NB-IOT adhoc; R1-160008; "NB-PUSCH design for NB-IOT;" Nokia Networks; Jan. 18-20, 2016; Budapest, Hungary (9 pages).

3GPP TSG-RAN WG1 Meeting #84bis; R1-162894 "Flexible numerology for 5G New Radio" Nokia, Alcatel-Lucent Shanghai Bell; Busan, Korea; Apr. 11-15, 2016 (5 pages).

Office Action issued in Japanese Application No. 2018-549060; Dated Dec. 21, 2021 (8 pages).

Office Action in counterpart Indian Patent Application No. 201917017426 issued on Sep. 27, 2021 (7 pages).

Office Action in counterpart Chinese Patent Application No. 201780081825.2 issued on Oct. 13, 2022 (12 pages).

* cited by examiner

|  | 15kHz | 30kHz | 60kHz | 120kHz | 240kHz |
|---|---|---|---|---|---|
| Number of symbols per slot | 7 | 7 | 7 | 14 | 14 |
| Slot length (ms) | 0.5 | 0.25 | 0.125 | 0.125 | 0.0675 |

FIG. 3

$$T_{s,15kHz} = 1/(15000 \times 2048)$$

$$T_{s,30kHz} = 1/(30000 \times 2048)$$

$$T_{s,60kHz} = 1/(60000 \times 2048)$$

$$T_{s,120kHz} = 1/(120000 \times 2048)$$

$$T_{s,240kHz} = 1/(240000 \times 2048)$$

FIG. 4

| SUBCARRIER SPACING \ FFT SIZE | 2048 | 4096 | 8192 |
|---|---|---|---|
| 15kHz | 1/(15000x2408) | 1/(15000x4096) | 1/(15000x8192) |
| 30kHz | 1/(30000x2408) | 1/(30000x4096) | 1/(30000x8192) |
| 60kHz | 1/(60000x2408) | 1/(60000x4096) | 1/(60000x8192) |
| 120kHz | 1/(120000x2408) | 1/(120000x4096) | 1/(120000x8192) |
| 240kHz | 1/(240000x2408) | 1/(240000x4096) | 1/(240000x8192) |

FIG. 5

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE, LTE-A (LTE Advanced, also referred to as LTE Rel. 10, 11 or 12) has been specified, and successor systems (e.g., also referred to as FRA (Future Radio Access), 5G (5th generation mobile communication system), NR (New Radio), NX (New radio access), FX (Future generation radio access), LTE Rel.13, 14 or 15 onward, etc.) to LTE have also been studied.

In LTE Rel.10/11, in order to widen the band, introduced is Carrier Aggregation (CA) for aggregating a plurality of carriers (Component Carrier: CC, cell). Each component carrier is configured with a system band of LTE Rel.8 as one unit. Further, in CA, a plurality of CCs of the same radio base station (eNB: eNodeB)) is configured for a user terminal (UE: User Equipment).

Further, in LTE Rel.12, Dual Connectivity (DC) is also introduced where a plurality of cell groups (CG: Cell Group) of different radio base stations is configured for a user terminal. Each cell group is comprised of at least a single carrier (CC, cell). Since a plurality of carriers of different radio base stations is aggregated, DC is also called inter-base station CA (Inter-eNB CA) and the like.

Furthermore, in the existing LTE system (e.g., LTE Rel.8-13), using a transmission time interval (TTI) of 1 ms, communication is performed on downlink (DL) and/or uplink (UL). The TTI of 1 ms is a transmission time unit of one data packet subjected to channel coding, and is a processing unit of scheduling, link adaptation, retransmission control (HARQ-ACK: Hybrid Automatic Repeat reQuest-Acknowledge) and the like. The TTI of 1 ms is also called a subframe, subframe length and the like.

CITATION LIST

Non-Patent Literature

[Non-patent Literature 1] 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY OF THE INVENTION

Technical Problem

In successor systems to LTE, in order to meet requirements for various communications, it is expected to introduce scalable numerology. In the case where numerology is varied, there is the risk of occurrences of the case where the time interval used in existing LTE is not applied without modification. Therefore, it is required to configure a proper time interval to meet requirements for various communications, and to perform various types of processing in this time interval.

The present invention was made in view of such a respect, and it is an object of the invention to provide a user terminal and radio communication method capable of configuring proper time intervals to meet various communication requirements in radio communication systems, and performing various types of processing in the time interval.

Solution to Problem

A user terminal according to one aspect is provided with a transmitting/receiving section that receives numerology information on numerology, and a control section that controls transmission of an uplink signal and/or reception of a downlink signal, according to a basic time unit determined based on configuration information including the numerology information.

Technical Advantage of the Invention

According to the present invention, it is possible to configure proper time intervals to meet various communication requirements in radio communication systems, and to perform various types of processing in the time interval.

BRIEF DESCRIPTION OF THE DRAWINGS

FIG. 3 is a diagram to explain a plurality of types of numerology;

FIG. 4 is a diagram to explain that a basic time unit ($T_S$) is determined according to subcarrier spacing;

FIG. 5 is a diagram to explain that a basic time unit ($T_S$) is determined according to subcarrier spacing and FFT size;

DESCRIPTION OF EMBODIMENTS

In future radio communication systems (e.g., LTE Rel.14 or 15, 5G, NR), it is expected to actualize various radio communication services so as to meet respective different requirements (e.g., ultra-high speed, high capacity, ultra-low delay, etc.).

For example, in 5G, it is studied to offer radio communication services called eMBB (enhanced Mobile Broad Band), IoT (Internet of Things), MTC (Machine Type Communication), M2M (Machine to Machine), URLLC (Ultra Reliable and Low Latency Communications) and the like. In addition, M2M may be called D2D (Device To Device), V2V (Vehicle To Vehicle) and the like corresponding to equipment to communicate. In order to meet requirements for above-mentioned various communications, it is studied to design new communication access technology (New RAT (Radio Access Technology)).

In NR, it is desired that a single framework accommodates various services such as high-speed and high-capacity communication (massive connection (mMTC: massive MTC) from devices (user terminals) for M2M communication such as eMBB, IoT, MTC, etc.), low-delay and high-reliability communication (URLLC: Ultra-reliable and low latency communication) and the like. In URLLC, higher delay reduction effects are required than in eMBB and mMTC.

Further, in NR, it is expected to support wide frequency bands including high frequencies. Specifically, a frequency band with a continuous width of 800 MHz, a width of 2 GHz or the like is considered in a frequency band of 6 GHz or more. The case is considered where a plurality of operators or a single operator uses such a wide frequency band.

In order to support various services as described above, it is expected to introduce one or more numerology. The numerology is a set of communication parameters (radio parameters) in the frequency and/or time domain. For example, such a communication parameter includes at least one of subcarrier spacing, bandwidth, symbol length, time length of cyclic prefix (CP), subframe length, time length of TTI (TTI length), the number of symbols per TTI, radio frame configuration, filtering processing, windowing processing and the like.

In addition, in the existing LTE system, a user terminal performs DL and/or UL communication using the TTI having a time length of 1 ms. Such a TTI is also called normal TTI, TTI, subframe, long TTI, normal subframe, long subframe, legacy TTI and the like, and is comprised of 2 slots. Further, cyclic prefix (CP) is added to each symbol within the normal TTI. In the case where normal CP (e.g., 4.76 μs) is added to each symbol, the normal TTI contains 14 symbols (7 symbols per slot) to be comprised thereof (see FIG. 1). Further, a TTI shorter than in the existing LTE system may be called a short TTI (e.g., less than 1 ms), shortened TTI, short TTI and the like.

Figure 1:
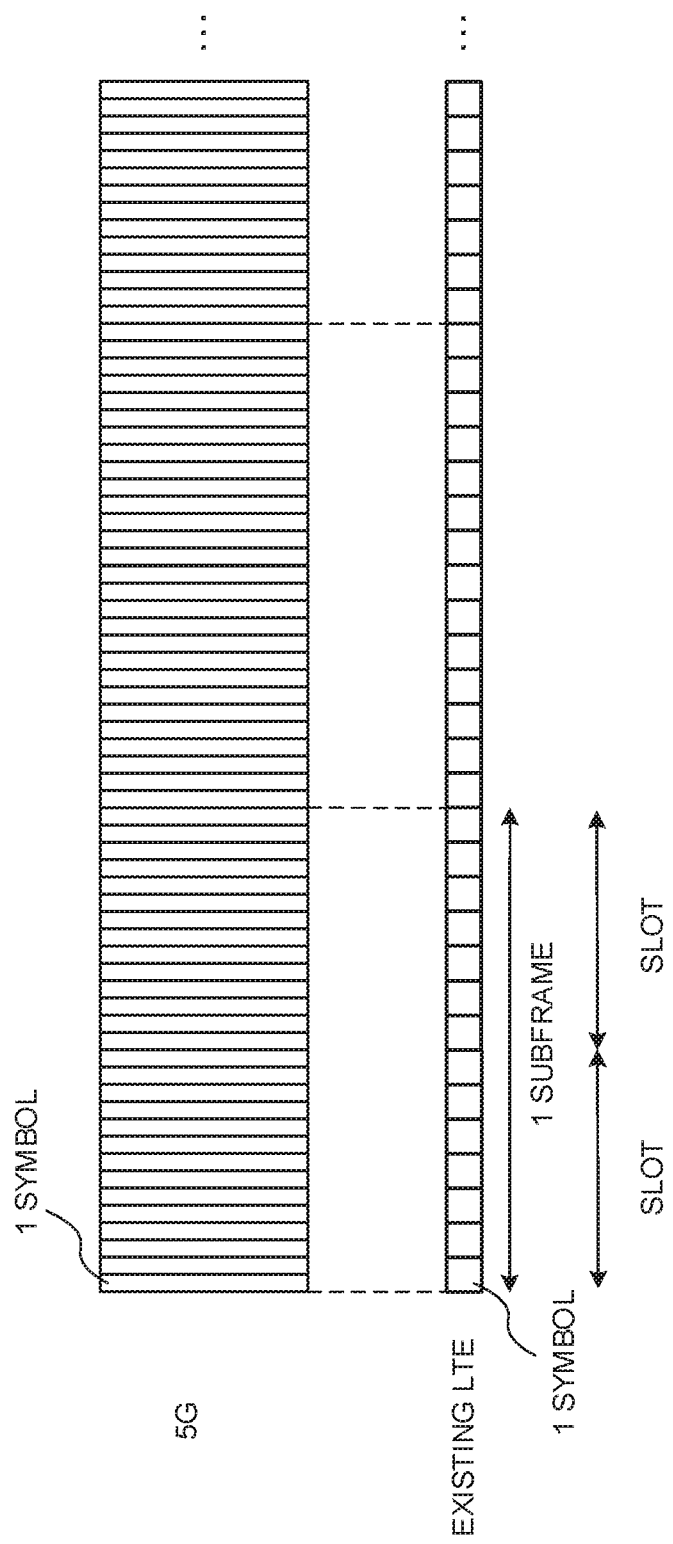
FIG. 1 is a diagram to explain increases in the number of symbols of one subframe by using a high frequency band.

For example, as one of the above-mentioned numerology, in the case of widening the subcarrier spacing in multicarrier transmission such as OFDM, since the symbol length is shortened (the symbol length and the subcarrier spacing are in a mutually reciprocal relationship), it is considered increasing the number of symbols per subframe (see FIG. 1). Similarly, also in the case of SC transmission (DFT-spread OFDM transmission), since the symbol length is shortened by widening a band using a high frequency band, it is considered increasing the number of symbols per subframe.

Figure 2A:
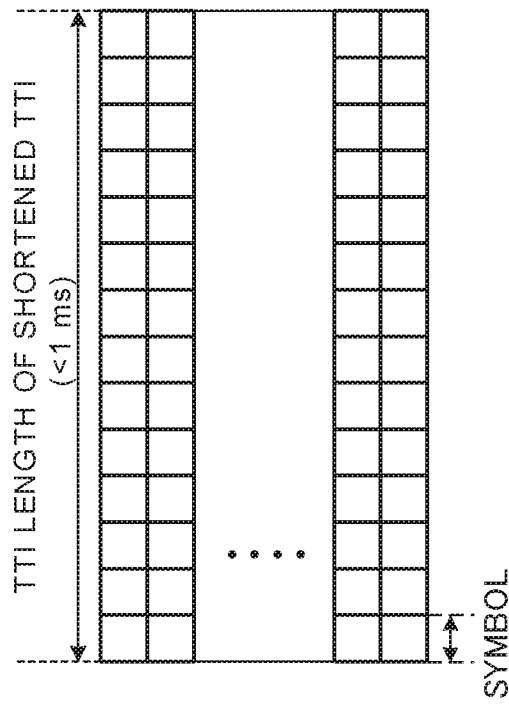
FIGS. 2A and 2B are diagrams illustrating configuration examples of a shortened TTI.
Figure 2B:
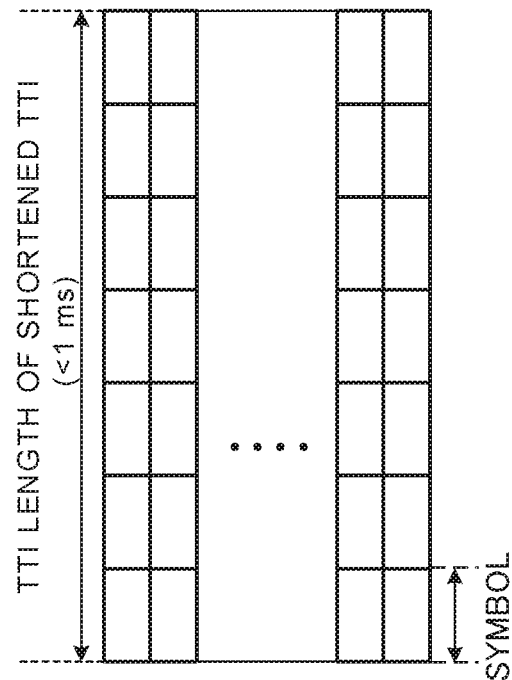

On the other hand, it is also considered that the number of symbols per subframe is made the existing number or less by using a shortened TTI. In FIG. 2A, the TTI is comprised of 14 OFDM symbols (or SC-FDMA symbols) the number of which is the same as in the normal TTI, and each OFDM symbol (each SC-FDMA symbol) has a symbol length shorter than the symbol length (=66.7 μs) of the normal TTI. In FIG. 2B, the TTI is comprised of OFDM symbols (or SC-FDMA symbols) the number of which is lower than in the normal TTI, and each OFDM symbol (each SC-FDMA symbol) has the same symbol length (=66.7 μs) as the normal TTI.

Further, in NR, it is expected that the above-mentioned numerology is specified to be scalable (or configurable). In such NR, there is the risk that it is not possible to apply the existing LTE technology without modification.

For example, in TA (Time Advanced) control for shifting a transmission time of an uplink signal forward, the time (timing) controlled by TA varies with specified numerology. Therefore, there is a possibility of occurrences of such a situation that reception timing is not matched, although the radio base station performs TA control so that the reception timing of an uplink signal is matched. Accordingly, it is necessary to take measures of providing each TAG (Timing Advance Group) with a parameter set for each numerology and the like, In view of such a circumstance, the inventors of the present invention conceived determining a proper basic time unit, corresponding to scalable numerology. Specifically, minimum time (basic time unit) serving as a basis on various processing in radio communication is determined to be scalable corresponding to numerology, and various processing of radio communication is controlled to be performed in a time interval determined based on (a multiple of) the minimum time.

RADIO COMMUNICATION METHOD

Aspect 1

Aspect 1 of a radio communication method according to one Embodiment of the present invention will be described below. In the radio communication method, based on numerology transmitted from a radio base station (network), a user terminal determines minimum time (basic time unit) serving as a basis on various processing in radio communication. In addition, the numerology information may be included in configuration information.

Described first is a basic time unit $T_S$ specified in existing LTE. OFDM (Orthogonal Frequency Division Multiplexing) is a basic transmission scheme in both downlink and uplink transmission directions of existing LTE. In existing LTE, OFDM subcarrier spacing is specified as 15 kHz on downlink and uplink.

In the case of assuming that a transmitter and receiver based on FFT (Fast Fourier Transform) are implemented in a user terminal and radio base station, the above-mentioned subcarrier spacing of 15 kHz corresponds to sampling rate $fs=15000 \, N_{FFT}$. $N_{FFT}$ is the FFT size.

In the time domain, existing LTE transmission is comprised of frames each with a length of 10 ms, and each frame is divided into 10 subframes with the same length of 1 ms.

Each subframe is comprised of 2 slots with the same length of $T_{slot}=0.5$ ms, and each slot is comprised of a plurality of OFDM symbols including cyclic prefix.

In such a configuration, the time interval used in existing LTE is specified as a multiple of basic time unit $T_S=1/(15000\times2048)$. Accordingly, the basic time unit $T_S$ is considered sampling time of the transmitter/receiver based on FFT with the FFT size of 2048.

Using the basic time unit $T_S$, it is possible to express that a frame length is $T_{frame}=307200T_S$, a subframe length is $T_{subframe}=30720T_S$, and that a slot length is $T_{slot}=15360T_S$.

In this Embodiment, the basic time unit $T_S$ is determined, based on numerology information transmitted from a radio base station. In addition, the basic time unit $T_S$ may be specified on a network-by-network basis.

Scalable numerology will be described next. In NR as described above, it is expected that scalable numerology is specified. FIG. 3 illustrates one example of such scalable numerology.

In FIG. 3, as numerology, the subcarrier spacing is used. As the subcarrier spacing, it is possible to configure five types of spacing. In other words, the spacing is 15 kHz, 30 kHz, 60 kHz, 120 kHz and 240 kHz. In the case where the subcarrier spacing is 15 kHz, 1 slot is comprised of 7 symbols, and the slot length is 0.5 ms.

In the case where the subcarrier spacing is 30 kHz, 1 slot is comprised of 7 symbols, and the slot length is 0.25 ms. In the case where the subcarrier spacing is 60 kHz, 1 slot is comprised of 7 symbols, and the slot length is 0.125 ms.

In the case where the subcarrier spacing is 120 kHz, 1 slot is comprised of 14 symbols, and the slot length is 0.125 ms. In the case where the subcarrier spacing is 240 kHz, 1 slot is comprised of 14 symbols, and the slot length is 0.0675 ms.

In addition, the numeric values illustrated in FIG. 3 are one example, and are not limited thereto. For example, in any subcarrier spacing, the number of symbols per slot may be made certain (14). Alternatively, the slot length is made 1 ms to be the same as the subframe length (configuration that 1 subframe contains 1 slot).

In Aspect 1 of the radio communication method, the basic time unit $T_S$ is determined, corresponding to each subcarrier spacing (numerology). To determine, basic time unit $T_{S,\ subcarrier\ spacing}=1/(\Delta_f\times2048)$ may be used to calculate. $\Delta_f$ represents the subcarrier spacing.

For example, in the case where a plurality of types of numerology is configurable as illustrated in FIG. 3, it is possible to use each of equations illustrated in FIG. 4 for calculation of the basic time unit $T_S$. In addition, in a user terminal, rather than preparation of equations for each subcarrier spacing, it is preferable to hold absolute values of the basic time unit $T_S$ that correspond to the subcarrier spacing to enable the processing on calculation to be eliminated.

In addition, in FIG. 4, the FFT size is fixed to "2048". However, it is considered that the FFT size is not fixed, and is adopted as one of scalable numerology. In such a case, for example, using a table illustrated in FIG. 5, a corresponding equation may be determined to calculate (determine) a basic time unit $T_S$. As a matter of course, in descriptions of FIG. 5, instead of the equation, it is preferable to hold already calculated values (absolute values) of the basic time unit $T_S$. Further, predetermined FFT sizes may be included in configuration information.

FIG. 5 illustrates the case where three types of FFT sizes of "2048", "4096" and "8192" are configurable as the FFT size. In addition, in the table of FIG. 5, in the case of the numeric value where each entry is calculated, it is also considered that it is possible to obtain (acquire) a value of basic time unit $T_S$ corresponding to scalable numerology.

Basic Time Unit $T_S$ Determining Processing

Figure 6:
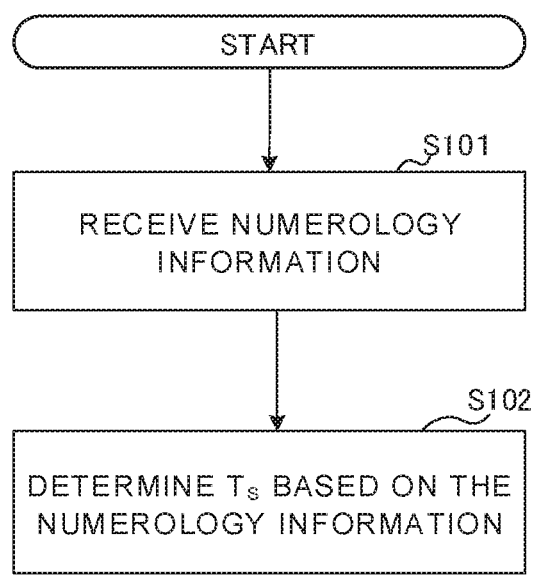
FIG. 6 is a diagram to explain basic time unit ($T_S$) determining processing in a user terminal.

One example of basic time unit $T_S$ determining processing in a user terminal in Aspect 1 will be described next with reference to FIG. 6. As illustrated in the figure, the user terminal receives numerology information from the network (S101). The numerology information includes information to identify numerology in scalable numerology.

For example, in the case where a plurality of types of subcarrier spacing is configurable as illustrated in FIG. 3, the numerology information includes information indicating which subcarrier spacing is applied. Further, in the case illustrated in FIG. 5, the numerology information includes the subcarrier spacing and FFT size.

Next, based on the numerology information, the user terminal determines a basic time unit $T_S$ (S102). For example, in the case where the numerology information indicates any subcarrier spacing (e.g., FIG. 3), the user terminal obtains a numeric value of the basic time unit $T_S$ that corresponds to the subcarrier spacing.

Alternatively, in the case where the numerology information indicates the subcarrier spacing and FFT size, from the table illustrated in FIG. 5, the user terminal obtains an absolute value of the basic time unit $T_S$. Hereinafter, based on the determined basic time unit $T_S$, the user terminal controls signal transmission on uplink and signal reception on downlink.

As described above, according to Aspect 1, proper time intervals are configured so as to meet various communication requirements in radio communication systems, and various processing is performed in the time interval. Specifically, corresponding to scalable numerology, it is possible to determine the basic time unit $T_S$. Since the basic time unit $T_S$ serves as a basis for every time interval used in radio communication systems such as NR, it is possible to perform all processing according to radio communication properly corresponding to the numerology.

Aspect 2

Described next is Aspect 2 of the radio communication method according to one Embodiment of the present invention. In the radio communication method, as in Aspect 1 described previously, a user terminal determines a basic time unit $T_S$ serving as a basis on various processing in radio communication.

In addition, in Aspect 2, the user terminal beforehand holds (stores) a predetermined reference value ($T_{S,\ reference}$). Then, the user terminal receives a scaling factor of numerology or/and a scaling factor of FFT size from the network (radio base station). Using the reference value $T_{S,\ reference}$ and each scaling factor, the user terminal determines the basic time unit $T_{S,n,m}$.

As the reference value ($T_{S,\ reference}$), for example, the basic time unit $T_S$ in the case of subcarrier spacing of 15 kHz may be used. In other words, the value may be specified by the following equation.

$$T_{S,\ reference}=1/(15000\times2048)$$

Further, in determining the basic time unit $T_{S,n,m}$, the following equation may be used.

$$T_{S,n,m}=T_{S,\ reference}/n/m$$

Herein, n represents a scaling factor of numerology, and m represents a scaling factor of FFT size.

With respect to one or both of n and m, the network side (radio base station) broadcasts, or the user terminal is capable of acquiring in a stage of initial access. Further, such a factor may be transmitted to the user terminal by higher layer signaling, or may be notified dynamically by L1/L2 signaling. Furthermore, the FFT size and m may be beforehand determined by specifications, or may be fixed for each frequency band.

Basic Time Unit $T_S$ Determining Processings

Figure 7:
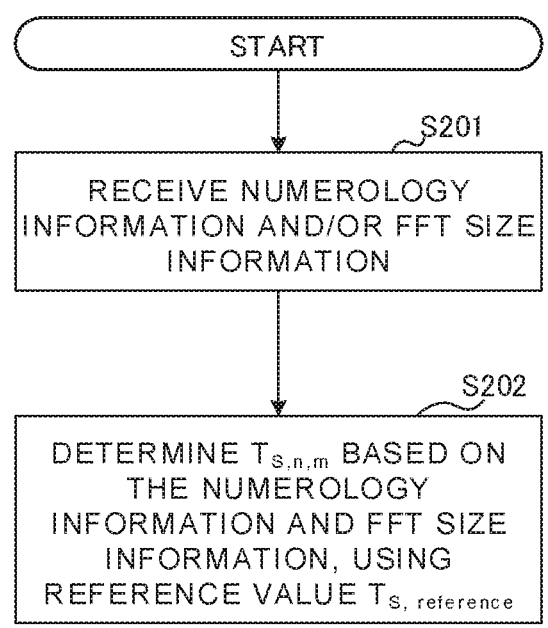
FIG. 7 is another diagram to explain basic time unit ($T_S$) determining processing in a user terminal.

One example of basic time unit $T_{S,n,m}$ determining processing in a user terminal in Aspect 2 will be described next with reference to FIG. 7. As illustrated in the figure, the user terminal receives numerology information or/and FFT size information from the network (S201).

The numerology information is a scaling factor for the user terminal to scale the beforehand held predetermined reference value $T_{S,\ reference}$, corresponding to the applied numerology. The FFT size information is a scaling factor for the user terminal to scale the beforehand held predetermined reference value ($T_{S,\ reference}$), corresponding to the applied FFT size. These pieces of numerology information and/or FFT size information may be included in the configuration information.

Next, using the predetermined reference value $T_{S,\ reference}$, based on the numerology information and FFT size information, the user terminal determines the basic time unit $T_{S,n,m}$ (S202). Hereinafter, based on the determined basic time unit $T_S$, the user terminal controls signal transmission on uplink and signal reception on downlink.

As described above, according to Aspect 2, proper time intervals are configured so as to meet various communication requirements in radio communication systems, and various processing is performed in the time interval. Specifically, corresponding to scalable numerology, it is possible to determine the basic time unit $T_{S,n,m}$. Since the basic time unit $T_S$ serves as a basis for every time interval used in radio communication systems such as NR, it is possible to perform all processing according to radio communication properly corresponding to the numerology.

Further, according to Aspect 2, since it is possible to determine the basic time unit $T_{S,n,m}$ supporting scalable numerology using the predetermined reference value $T_{S,\ reference}$, it is possible to enhance scalability to the numerology. Furthermore, since the held data is only the predetermined reference value $T_{S,\ reference}$ and the equation ($T_{S,n,m} = T_{S,\ reference}/n/m$), it is possible to suppress the load on the user terminal.

Expression of Time Unit

Next, in Aspect 2, for TA, in specifications, using the basic time unit $T_{S,n,m}$, it is possible to express the time unit without varying the number of samples. In the case of not varying the number of samples, it is possible to express $(N_{TA}+N_{TA\ offset}) \times T_S$ as $(N_{TA}+N_{TA\ offset}) \times T_{S,n,m}$, where $0 \leq N_{TA} \leq 20512$.

On the other hand, in specifications, irrespective of numerology, it is considered that an absolute value of the basic time unit $T_S$ is fixed. In such a case, using the above-mentioned $T_{S,n,m}$, it is possible to specify equations as described below.

The subframe length is as described below (fixed to 1 ms).

$T_f = X \times T_{S,n,m} = 1$ ms $X = 30720$ for n=1, m=1

The guard between DL and UL is as described below.

$T\ \text{guard} = y \times T_{S,n,m} = 20$ μs y=614 for n=1, m=1

Figure 11:
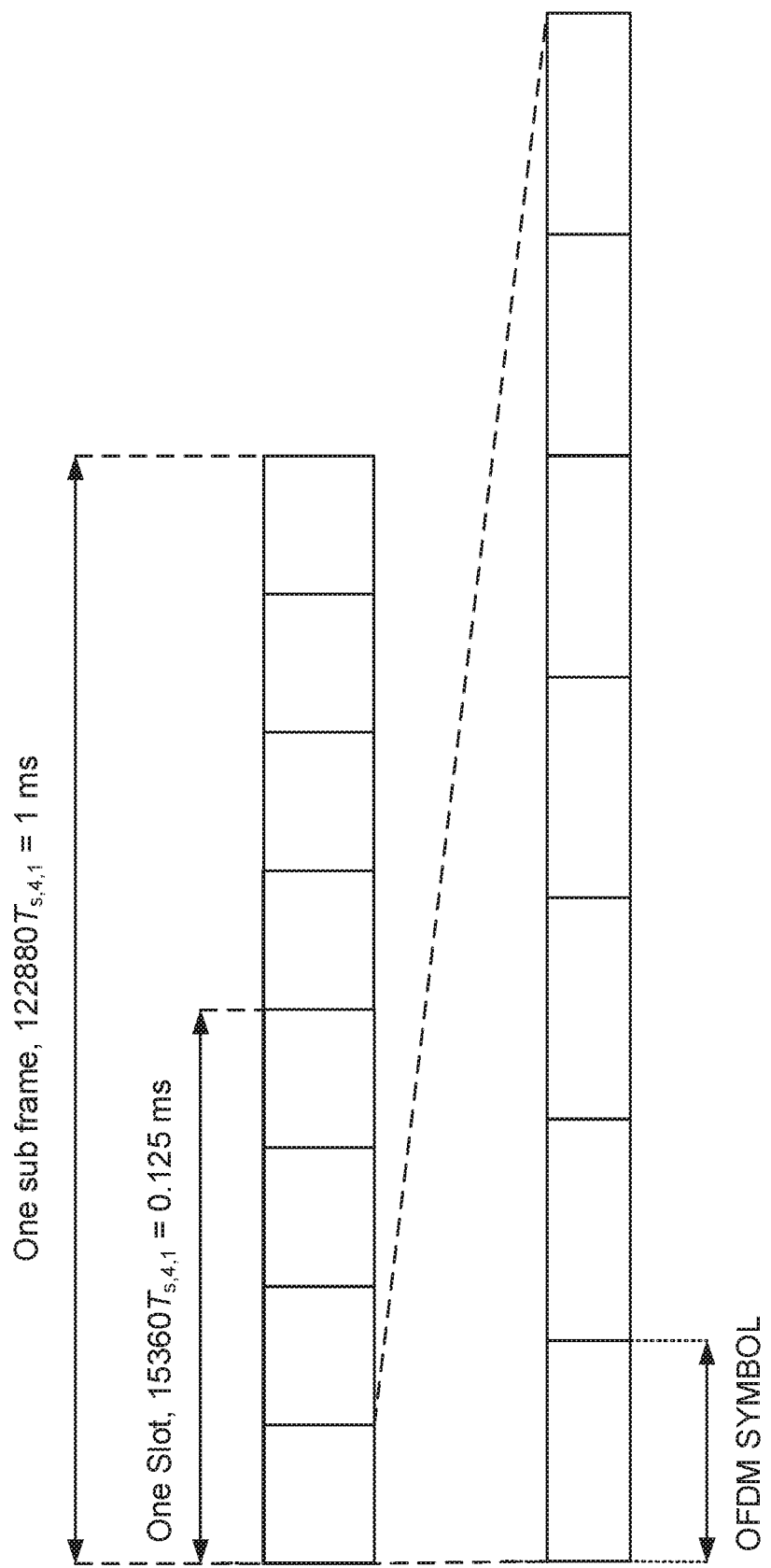
FIG. 11 is another diagram to explain one example of the subframe configuration based on the basic time unit ($T_S$)
Figure 12:
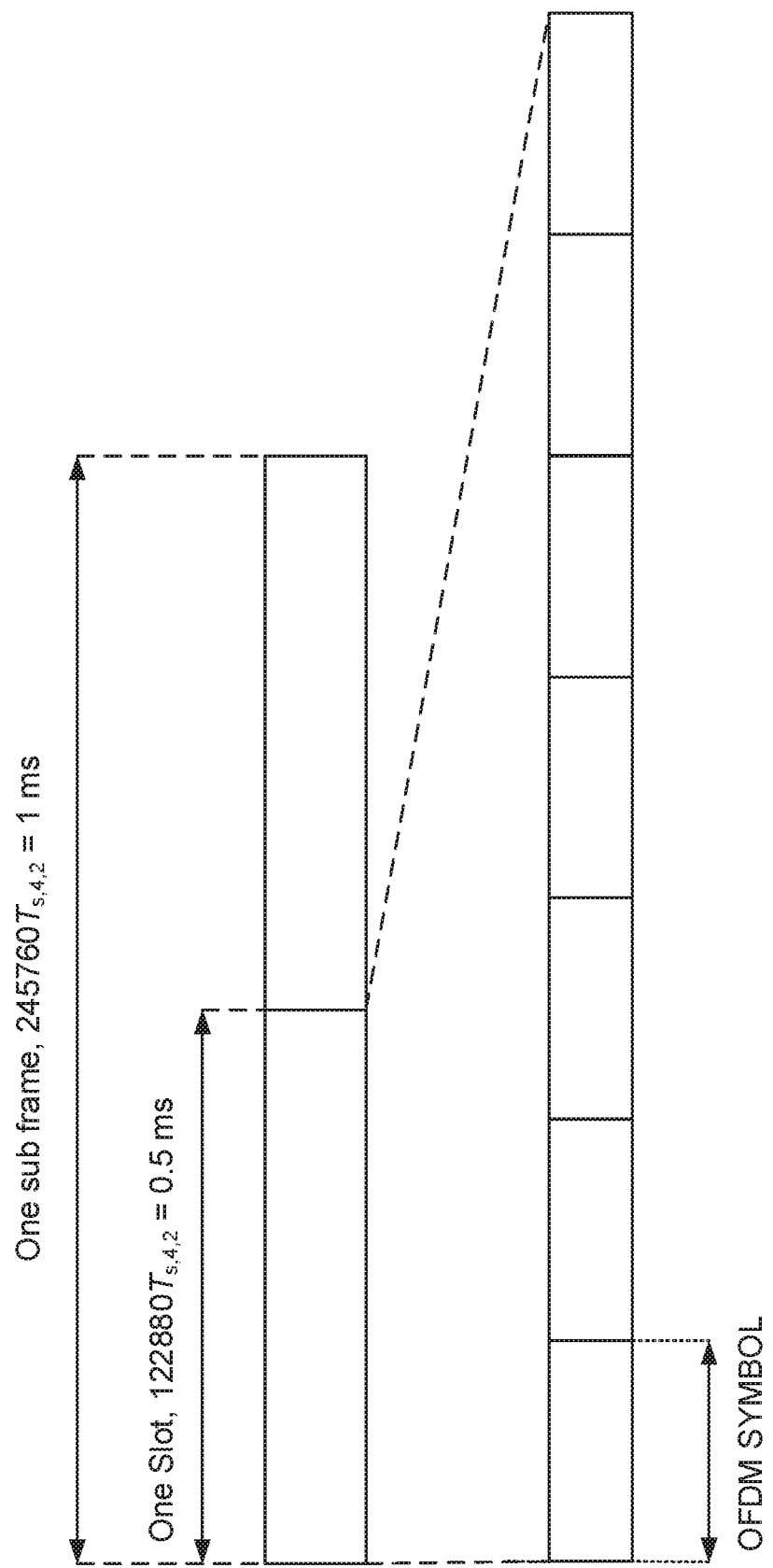
FIG. 12 is still another diagram to explain one example of the subframe configuration based on the basic time unit ($T_S$)
Figure 13:
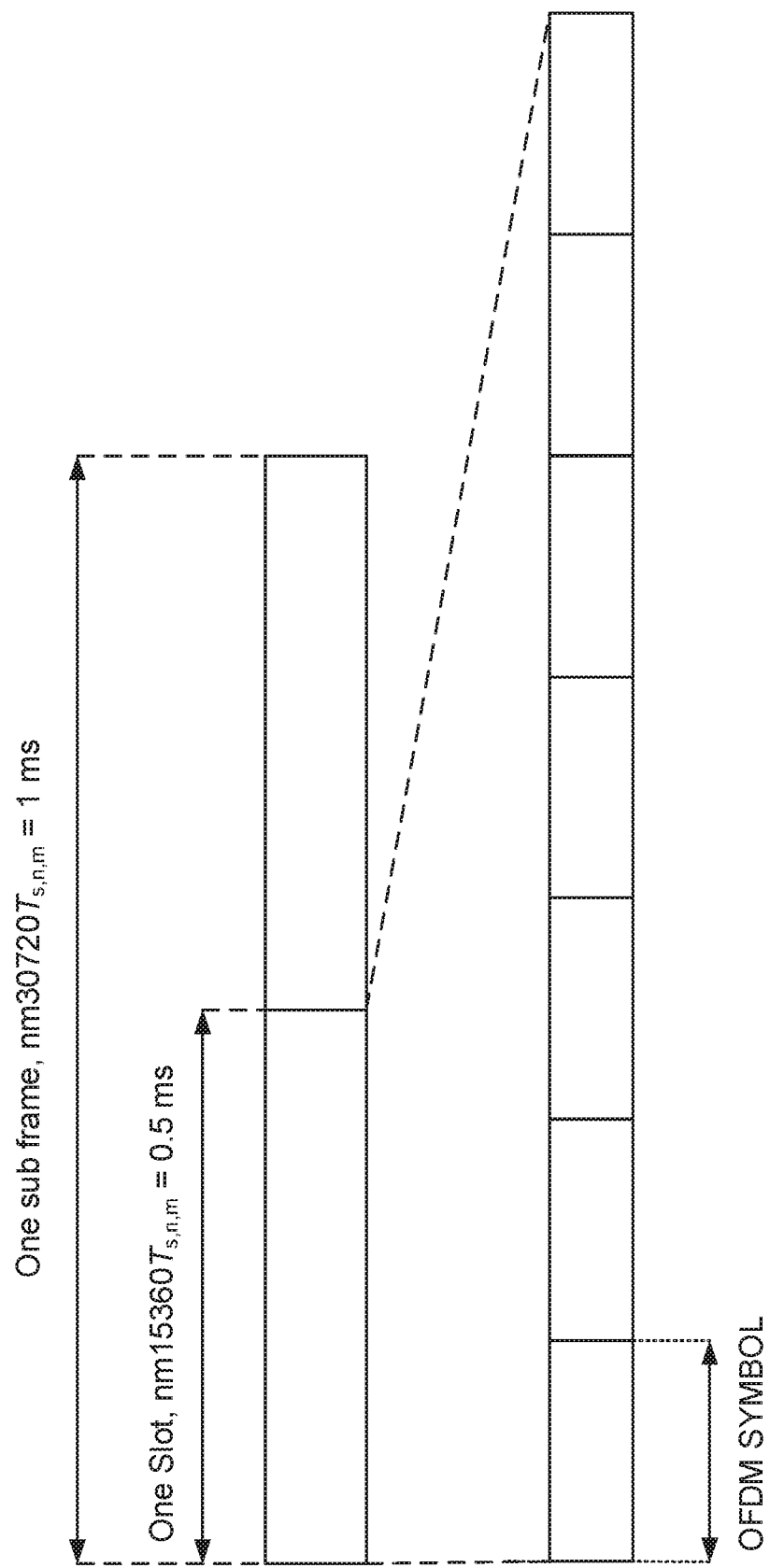
FIG. 13 is still another diagram to explain one example of the subframe configuration based on the basic time unit ($T_S$)

Herein, FIGS. 8 and 9 illustrate expression examples of 1 subframe with Aspect 2 applied. In addition, further, FIGS. 11 to 13 illustrate examples including the slot configuration and symbol configuration. In addition, the number of slots and the number of symbols illustrated in FIGS. 11 to 13 are one example, and are not limited thereto.

Figure 8A:
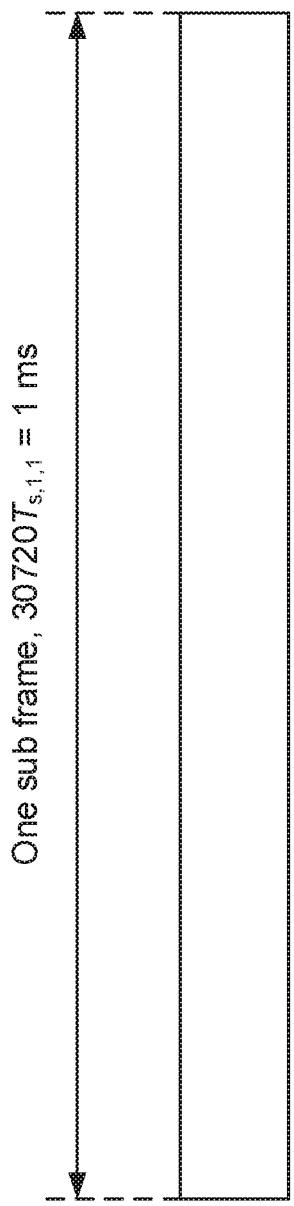
FIGS. 8A and 8B are diagrams to explain one example of subframe length expression using the basic time unit ($T_S$)
Figure 8B:
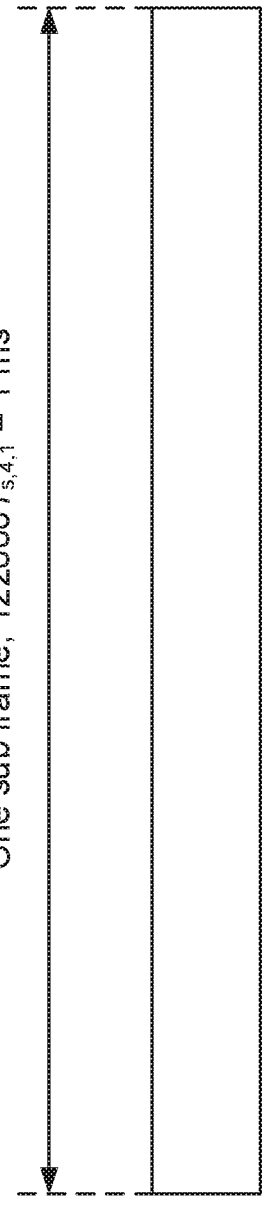
Figure 9A:
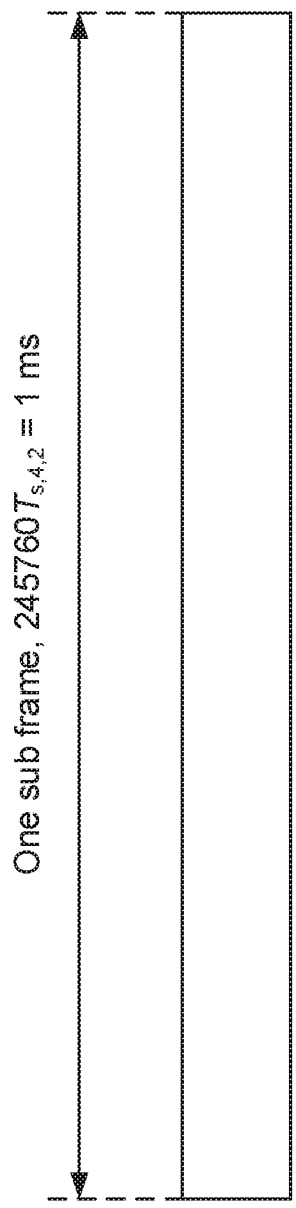
FIGS. 9A and 9B are diagrams to explain one example of subframe length expression using the basic time unit ($T_S$)
Figure 9B:
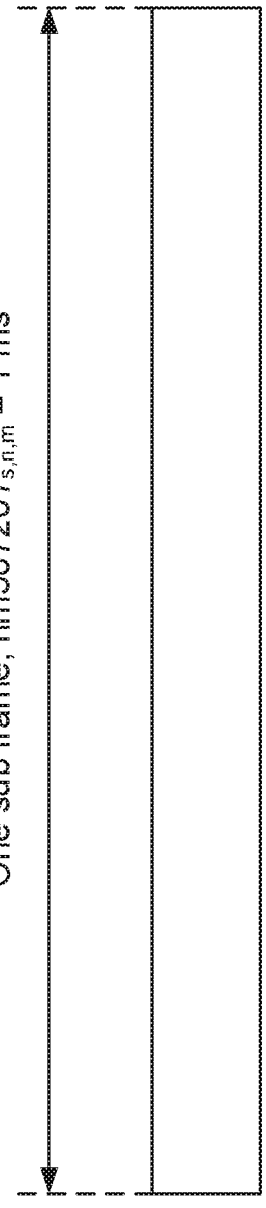
Figure 10:
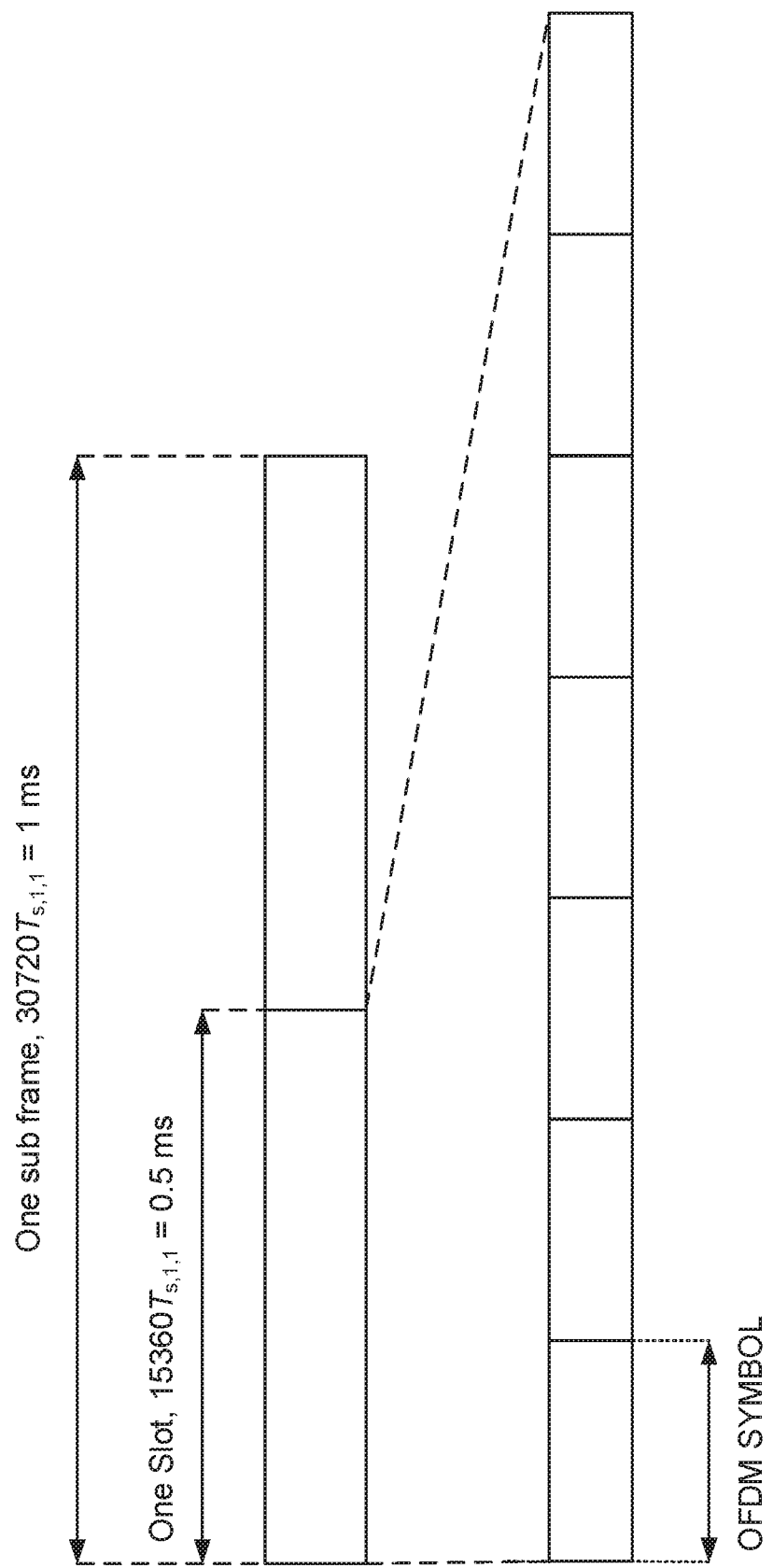
FIG. 10 is a diagram to explain one example of a subframe configuration based on the basic time unit ($T_S$)

FIG. 8A illustrates a subframe in the case where the subcarrier spacing is 15 kHz and the FFT size is "2048". FIG. 8B illustrates a subframe in the case where the subcarrier spacing is 60 kHz and the FFT size is "2048". FIG. 9A illustrates a subframe in the case where the subcarrier spacing is 60 kHz and the FFT size is "4096". FIG. 9B illustrates a subframe in the case where the subcarrier spacing is n×15 kHz and the FFT size is m×2048.

Radio Communication System

A configuration of a radio communication system according to this Embodiment will be described below. In the radio communication system, the radio communication method according to each of the above-mentioned Aspects is applied. In addition, the radio communication method according to each of the above-mentioned Aspects may be applied alone, or may be applied in combination.

Figure 14:
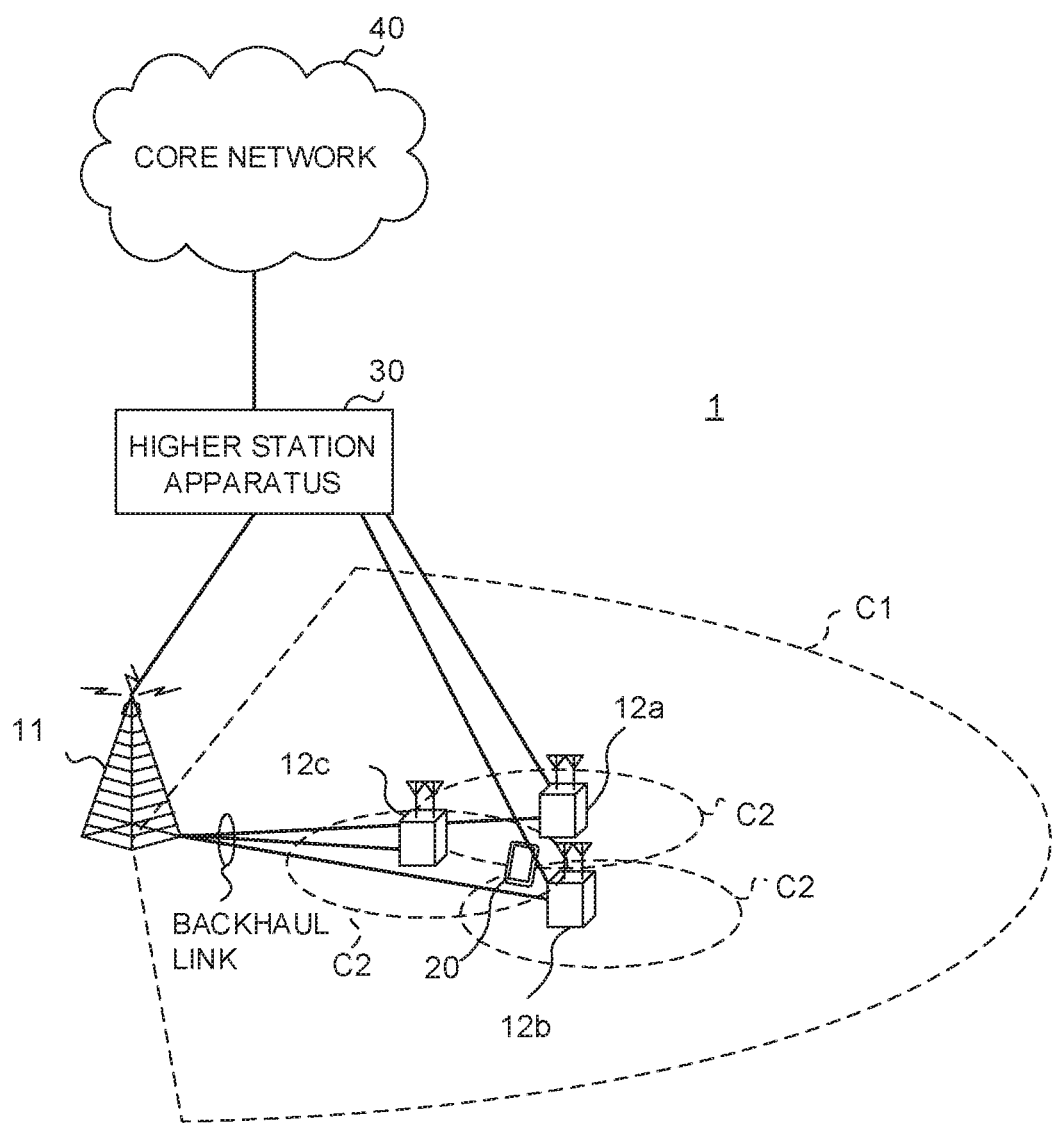
FIG. 14 is a diagram illustrating one example of a schematic configuration of a radio communication system according to this Embodiment.

FIG. 14 is a diagram illustrating one example of a schematic configuration of the radio communication system according to this Embodiment. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC). In addition, the radio communication system 1 may be called SUPER 3G, LTE-A (LTE-Advanced), IMT-Advanced, 4G, 5G, FRA (Future Radio Access), NR (New Rat: New Radio Access Technology) and the like.

Further, in the radio communication system 1, it is possible to apply various types of techniques (numerology, beam forming, etc.). Scalable numerology for enabling a plurality of configuration changes may be applied as the numerology.

The radio communication system 1 as illustrated in FIG. 14 is provided with a radio base station 11 for forming a macrocell C1, and radio base stations 12a to 12c disposed inside the macrocell C1 to form small cells C2 narrower than the macrocell C1. Further, a user terminal 20 is disposed in the macrocell C1 and each of the small cells C2. It may be configured to apply different numerology between cells and/or inside the cell.

The user terminal 20 is capable of connecting to both the radio base station 11 and the radio base station 12. The user terminal 20 is assumed to concurrently use the macrocell C1 and small cell C2 using different frequencies, by CA or DC. Further, the user terminal 20 may apply CA or DC using a plurality of cells (CCs) (e.g., 2 or more CCs). Furthermore, the user terminal is capable of using a licensed band CC and an unlicensed band CC as a plurality of CCs.

Moreover, the user terminal 20 is capable of performing communication in each cell, using Time Division Duplex (TDD) or Frequency Division Duplex (FDD). A cell of TDD and a cell of FDD may be called TDD carrier (Frame configuration type 2), FDD carrier (Frame configuration type 1), or the like, respectively.

Further, in each cell (carrier), a single numerology may be applied, or a plurality of different types of numerology may be applied.

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, 30 GHz to 70 GHs, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), gNB, transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal. Further, the user terminal 20 is capable of performing Device-to-Device (D2D) communication with another user terminal 20

In the radio communication system 1, as radio access schemes, OFDMA (Orthogonal Frequency Division Multiple Access) is applicable on downlink (DL), and SC-FDMA (Single Carrier-Frequency Division Multiple Access) is applicable on uplink (UL). OFDMA is a multi-carrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and OFDMA may be used on UL.

As DL channels, in the radio communication system 1 are used a DL shared channel (PDSCH: Physical Downlink Shared Channel, also referred to as DL data channel, etc.) shared by user terminals 20, broadcast channel (PBCH: Physical Broadcast Channel), L1/L2 control channels and the like. User data, higher layer control information, SIB (System Information Block) and the like are transmitted on the PDSCH. Further, MIB (Master Information Block) is transmitted on the PBCH.

The L1/L2 control channel includes DL control channels (PDCCH (Physical Downlink Control Channel), EPDCCH (Enhanced Physical Downlink Control channel)), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. The EPDCCH is frequency division multiplexed with the PDSCH to be used in transmitting the DCI and the like as the PDCCH. It is possible to transmit retransmission instruction information (ACK/NACK) of HARQ to the PUSCH, using at least one of the PHICH, PDCCH and EPDCCH.

As UL channels, in the radio communication system 1 are used a UL shared channel (PUSCH: Physical Uplink Shared Channel, also referred to as UL data channel, etc.) shared by user terminals 20, UL control channel (PUCCH: Physical Uplink Control Channel), random access channel (PRACH: Physical Random Access Channel) and the like. User data and higher layer control information is transmitted on the PUSCH. Uplink control information (UCI) including at least one of retransmission control information (A/N) of a DL signal, channel state information (CSI) and the like is transmitted on the PUSCH or PUCCH. It is possible to transmit a random access preamble to establish connection with the cell on the PRACH.

Communication between the radio base stations 11, 12 and the user terminal 20 supports analog beam forming, multi-beam/multi-stream transmission, and a plurality of numerology.

Radio Base Station

Figure 15:
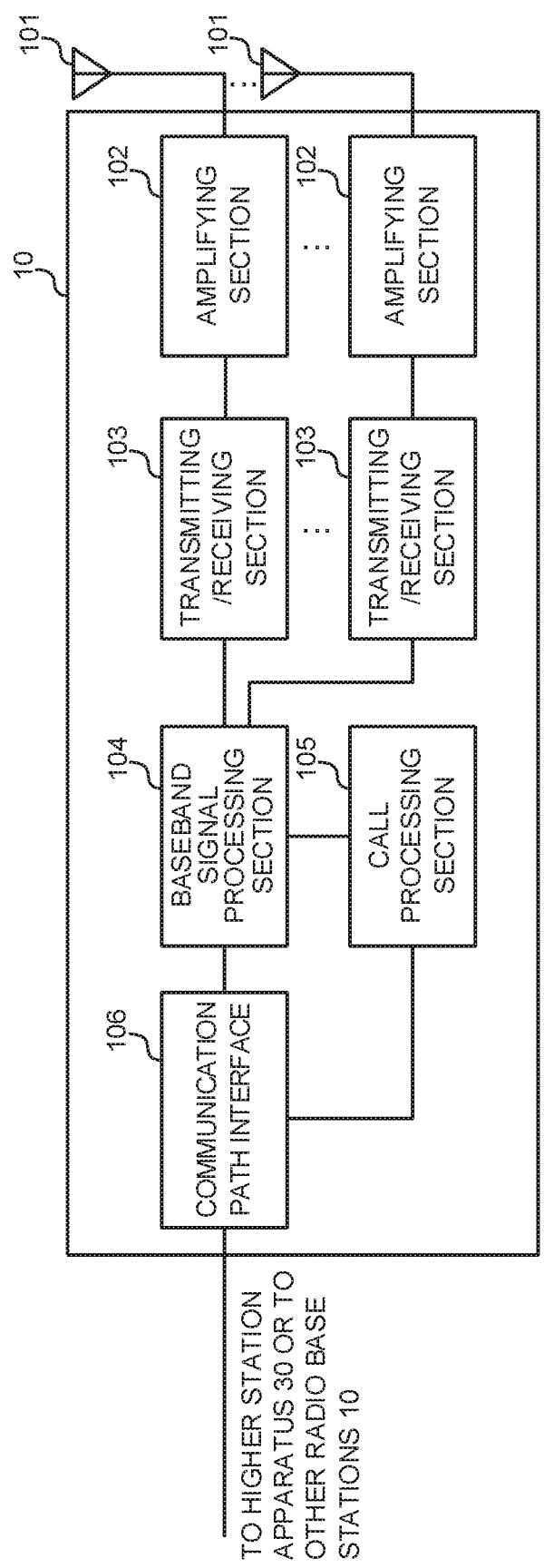
FIG. 15 is a diagram illustrating one example of an entire configuration of a radio base station according to this Embodiment.

FIG. 15 is a diagram illustrating one example of an entire configuration of the radio base station according to this Embodiment. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ (Hybrid Automatic Request reQuest)), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101.

The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for UL signals, radio-frequency signals received in the transmitting/receiving antennas 101 are amplified in the amplifying sections 102. The transmitting/receiving section 103 receives the UL signal amplified in the amplifying section 102. The transmitting/receiving section 103 performs frequency conversion on the received signal into a baseband signal to output to the baseband signal processing section 104.

For UL data included in the input UL signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing such as configuration and release of a communication channel, state management of the radio base station 10, and management of radio resources.

The communication path interface 106 transmits and receives signals to/from the higher station apparatus 30 via a predetermined interface. Further, the communication path interface 106 may transmit and receive signals (backhaul signaling) to/from another adjacent radio base station 10 via an inter-base station interface (e.g., optical fiber in conformity with CPRI (Common Public Radio Interface), X2 interface).

Further, the transmitting/receiving section 103 receives UE capability information to send to the baseband signal processing section 104. Furthermore, the transmitting/receiving section 103 transmits, to the user terminal 20, band information sent from the baseband signal processing section 104.

Figure 16:
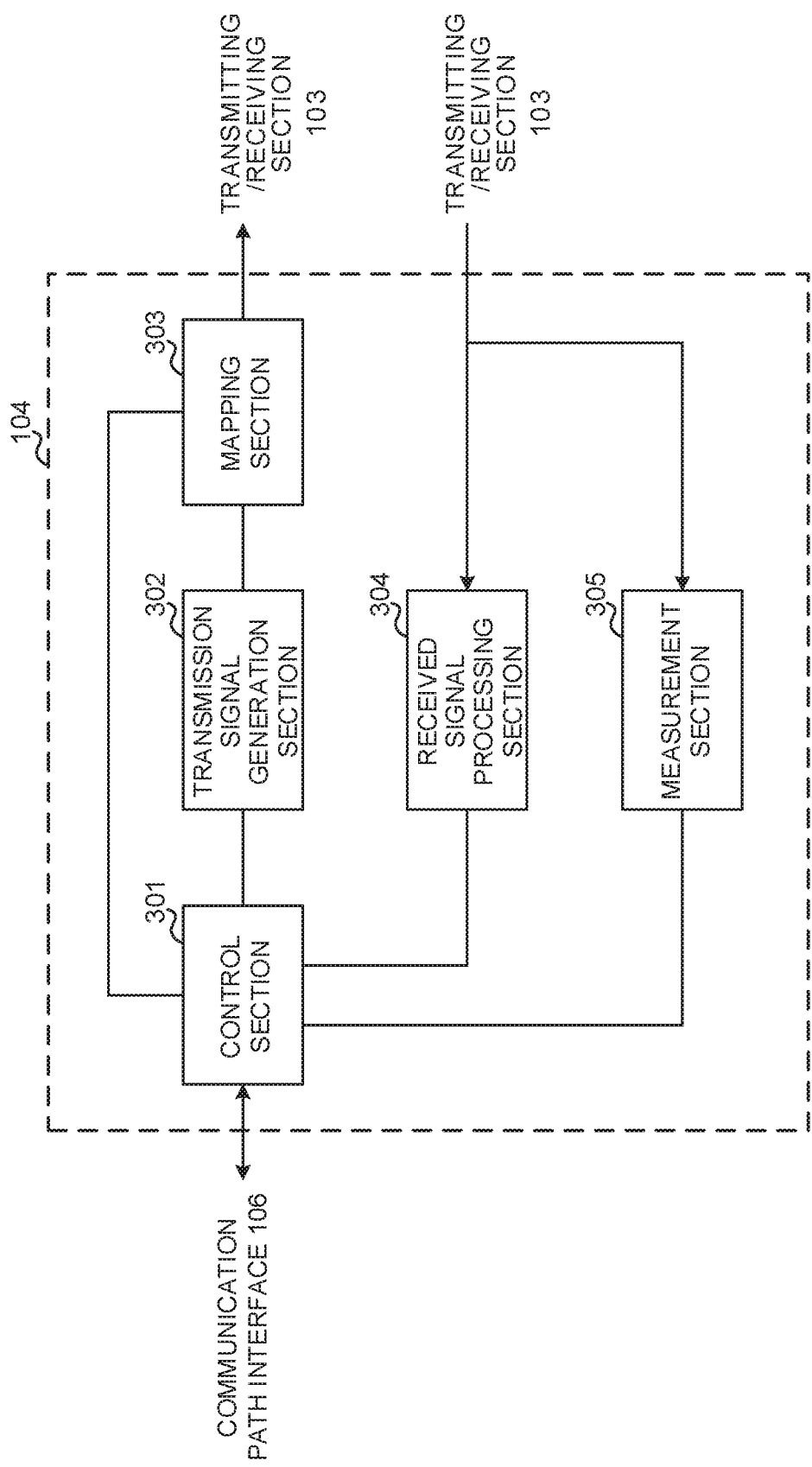
FIG. 16 is a diagram illustrating one example of a function configuration of the radio base station according to this Embodiment.

FIG. 16 is a diagram illustrating one example of a function configuration of the radio base station according to this Embodiment. In addition, FIG. 16 mainly illustrates function blocks of a characteristic portion in this Embodiment, and the radio base station 10 is assumed to have other function blocks required for radio communication. As illustrated in FIG. 16, the baseband signal processing section 104 is provided with a control section 301, transmission signal generating section 302, mapping section 303, received signal processing section 304, and measurement section 305.

The control section 301 performs control of the entire radio base station 10. For example, the control section 301 controls generation of DL signals by the transmission signal generating section 302, mapping of DL signals by the mapping section 303, reception processing (e.g., demodulation, etc.) of UL signals by the received signal processing section 304, and measurement by the measurement section 305.

For example, the control section 301 performs control so as to support at least one of Aspects 1 and 2 in the above-mentioned Embodiment. For example, in scalable numerology, the section 301 controls to notify the user terminal of the numerology information including the information for identifying the numerology. Further, the section 301 controls to notify the user terminal of a scaling factor of numerology and/or a scaling factor of FFT size.

The control section 301 is capable of being comprised of a controller, control circuit or control apparatus explained based on the common recognition in the technical field according to the present invention.

Based on instructions from the control section 301, the transmission signal generating section 302 generates DL signals (including DL data signal, scheduling information and short TTI configuration information) to output to the mapping section 303.

The transmission signal generating section 302 is capable of being a signal generator, signal generating circuit or signal generating apparatus explained based on the common recognition in the technical field according to the present invention.

Based on instructions from the control section 301, the mapping section 303 maps the DL signal generated in the transmission signal generating section 302 to predetermined radio resources to output to the transmitting/receiving section 103. The mapping section 303 is capable of being a mapper, mapping circuit or mapping apparatus explained based on the common recognition in the technical field according to the present invention.

The received signal processing section 304 performs reception processing (e.g., demapping, demodulation, decoding, etc.) on the UL signal (e.g., UL data signal, UL control signal, UCI, short TTI support information, etc.) transmitted from the user terminal 20. Specifically, based on the numerology configured for the user terminal 20, the received signal processing section 304 performs the reception processing of the UL signal. Further, the received signal processing section 304 may output the received signal and signal subjected to the reception processing to the measurement section 305. Furthermore, the received signal processing section 304 performs the reception processing on A/N of the DL signal, and outputs ACK or NACK to the control section 301.

The measurement section 305 performs measurement on the received signal. The measurement section 305 is capable of being comprised of a measurement device, measurement circuit or measurement apparatus explained based on the common recognition in the technical field according to the present invention.

For example, based on received power (e.g., RSRP (Reference Signal Received Power)) and/or received quality (e.g., RSRQ (Reference Signal Received Quality)) of the UL reference signal, the measurement section 305 may measure the channel quality of UL. The measurement result may be output to the control section 301.

User Terminal

Figure 17:
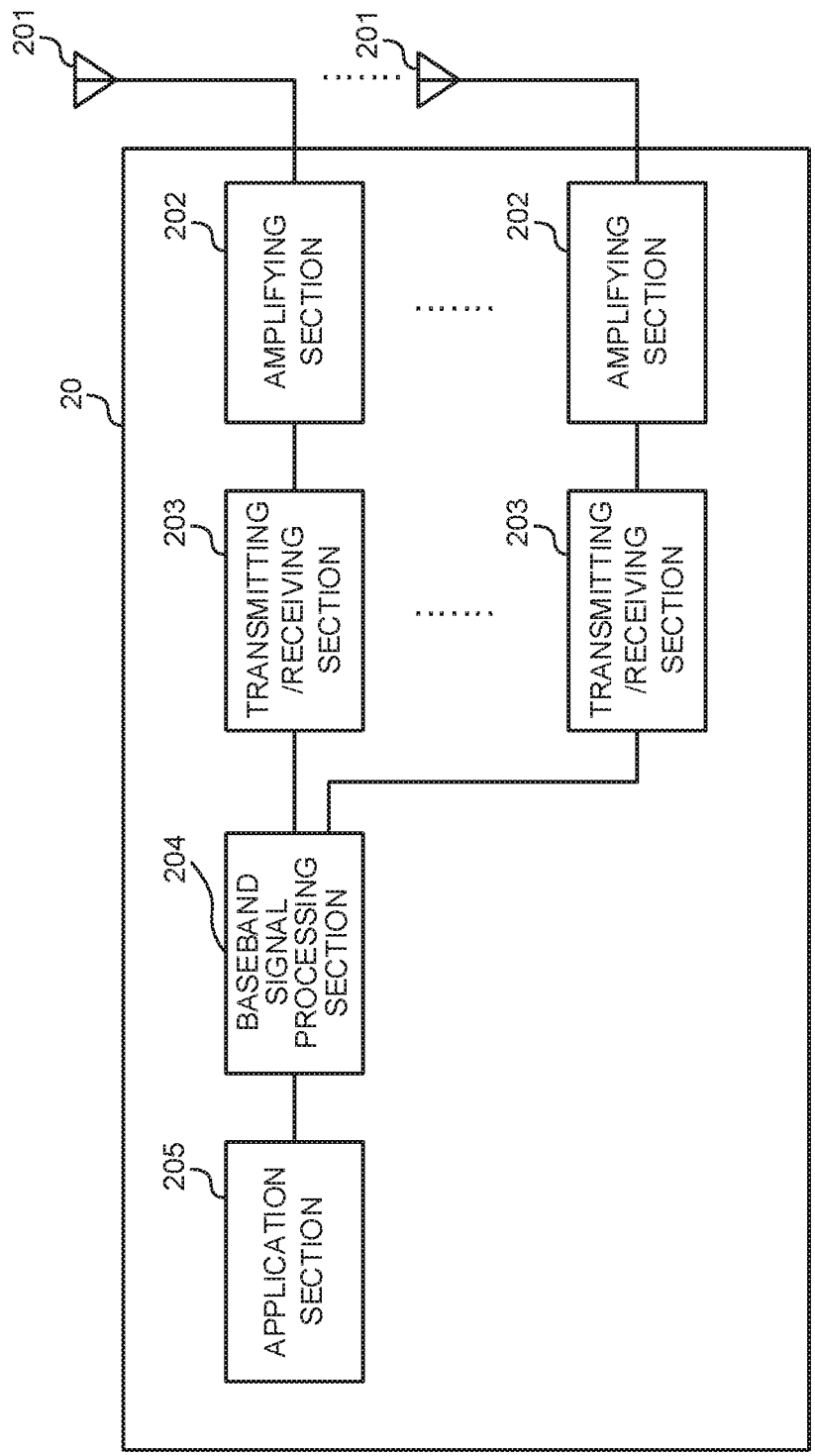
FIG. 17 is a diagram illustrating one example of an entire configuration of a user terminal according to this Embodiment.

FIG. 17 is a diagram illustrating one example of an entire configuration of the user terminal according to this Embodiment. The user terminal 20 is provided with a plurality of transmitting/receiving antennas 201 for MIMO transmission, amplifying sections 202, transmitting/receiving sections 203, baseband signal processing section 204, and application section 205.

Radio-frequency signals received in a plurality of transmitting/receiving antennas 201 are respectively amplified in the amplifying sections 202. Each of the transmitting/receiving sections 203 receives the DL signal amplified in the amplifying section 202. The transmitting/receiving section 203 performs frequency conversion on the received signal into a baseband signal to output to the baseband signal processing section 204.

The baseband signal processing section 204 performs FFT processing, error correcting decoding, reception processing of retransmission control and the like on the input baseband signal. DL data is transferred to the application section 205. The application section 205 performs processing concerning layers higher than the physical layer and MAC layer, and the like. Further, the broadcast information is also transferred to the application section 205.

On the other hand, for UL data, the data is input to the baseband signal processing section 204 from the application section 205. The baseband signal processing section 204 performs, on the data, transmission processing of retransmission control (e.g., transmission processing of HARQ), channel coding, rate matching, puncturing, Discrete Fourier Transform (DFT) processing, IFFT processing and the like to transfer to each of the transmitting/receiving sections 203. Also on the UCI (e.g., retransmission control information of DL, channel state information, etc.), the section 204 performs channel coding, rete matching, puncturing, DFT processing, IFFT processing and the like to transfer to each of the transmitting/receiving sections 203.

For example, as in the above-mentioned UE configuration examples 1 and 2, the baseband signal processing section 204 may be provided with a signal series for a plurality of bandwidths.

Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

Further, the transmitting/receiving section 203 receives the band information to send to the baseband signal processing section 204. Furthermore, the transmitting/receiving section 203 transmits, to the radio base stations 11, 12, the UE capability information sent from the baseband signal processing section 204. Herein, the band information indicates a DL candidate band that is a band of allocation candidates for the downlink (DL) signal and/or a DL candidate band that is a band of allocation candidates for the uplink (UL) signal.

Moreover, the transmitting/receiving section 203 receives a broadcast signal in frequency resources that correspond to the frequency raster where the synchronization signal is detected.

The transmitting/receiving section 203 is capable of being a transmitter/receiver, transmitting/receiving circuit or transmitting/receiving apparatus explained based on the common recognition in the technical field according to the present invention. Further, the transmitting/receiving section 203 may be comprised as an integrated transmitting/receiving section, or may be comprised of a transmitting section and receiving section.

Figure 18:
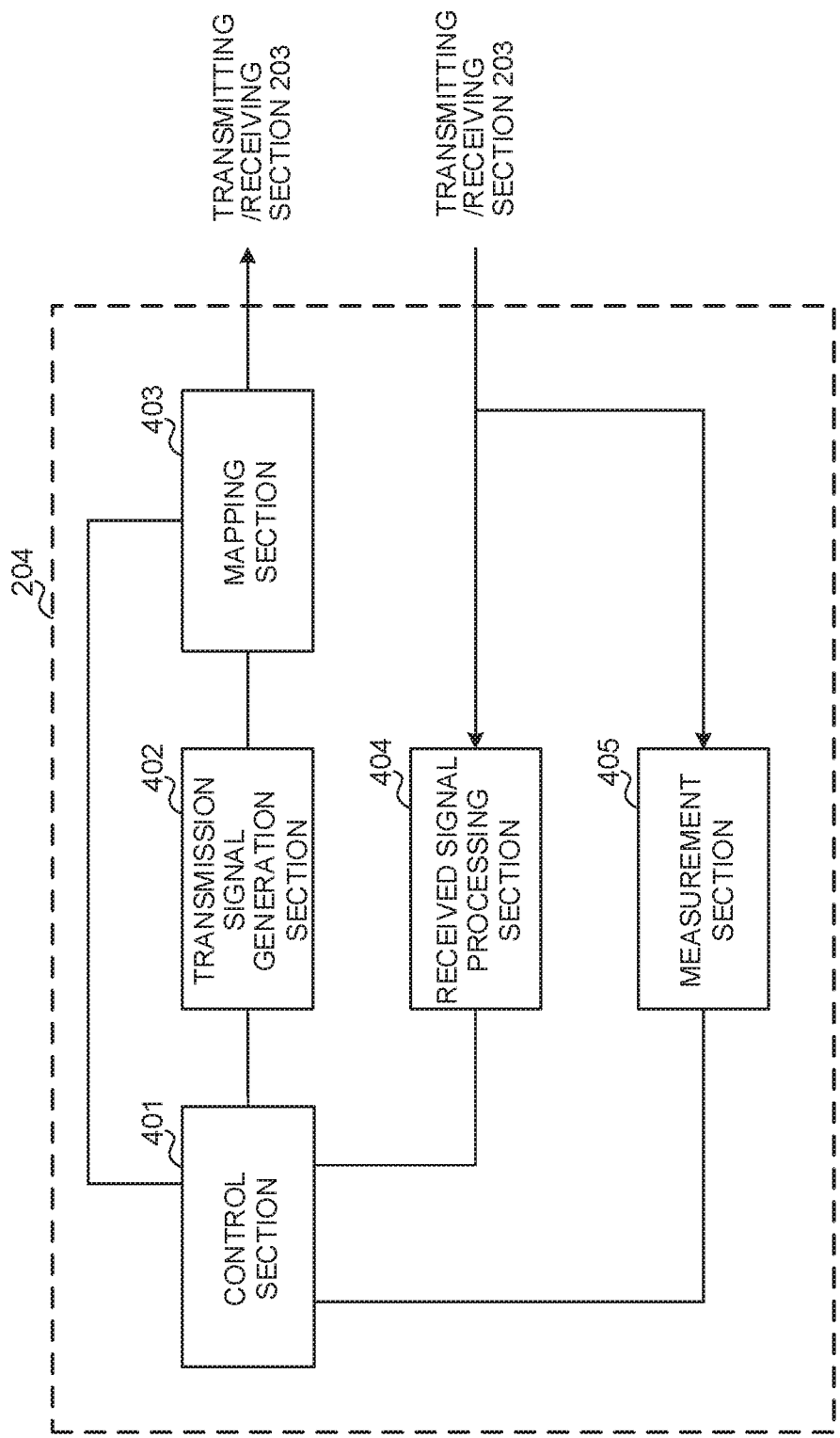
FIG. 18 is a diagram illustrating one example of a function configuration of the user terminal according to this Embodiment.

FIG. 18 is a diagram illustrating one example of a function configuration of the user terminal according to this Embodiment. In addition, FIG. 18 mainly illustrates function blocks of a characteristic portion in this Embodiment, and the user terminal 20 is assumed to have other function blocks required for radio communication. As illustrated in FIG. 18, the baseband signal processing section 204 that the user terminal 20 has is provided with a control section 401, transmission signal generating section 402, mapping section 403, received signal processing section 404, and measurement section 405.

The control section 401 performs control of the entire user terminal 20. For example, the control section 401 controls generation of UL signals by the transmission signal generating section 402, mapping of UL signals by the mapping section 403, reception processing of DL signals by the received signal processing section 404, and measurement by the measurement section 405.

Further, the control section 401 performs control so as to support at least one of Aspects 1 and 2 in the above-mentioned Embodiment. For example, the section 401 receives the numerology information on numerology, and according to a basic time unit determined based on the numerology information, controls transmission of an uplink signal and/or reception of a downlink signal.

Furthermore, based on the numerology information and predetermined FFT (Fast Fourier Transform) size, the section 401 determines the basic time unit, and using a time interval defined by a multiple of the above-mentioned basic time unit, may control transmission of an uplink signal and/or reception of a downlink signal.

Still furthermore, the control section 401 receives the FFT size information on the FFT size, determines the basic time unit from the predetermined reference value, based on the numerology information and FFT size information, and using a time interval defined by a multiple of the above-mentioned basic time unit, may control transmission of an uplink signal and/or reception of a downlink signal.

The control section 401 is capable of being comprised of a controller, control circuit or control apparatus explained based on the common recognition in the technical field according to the present invention.

Based on instructions from the control section 401, the transmission signal generating section 402 generates (e.g., performs coding, rate matching, puncturing, modulation, etc. on) UL signals (including the UL data signal, UL control signal, UL reference signal, UCI, and short TTI support information) to output to the mapping section 403. The transmission signal generating section 402 is capable of being a signal generator, signal generating circuit or signal generating apparatus explained based on the common recognition in the technical field according to the present invention.

Based on instructions from the control section 401, the mapping section 403 maps the UL signal generated in the transmission signal generating section 402 to radio resources to output to the transmitting/receiving section 203. The mapping section 403 is capable of being a mapper, mapping circuit or mapping apparatus explained based on the common recognition in the technical field according to the present invention.

The received signal processing section 404 performs reception processing (e.g., demapping, demodulation, decoding, etc.) on the DL signal (DL data signal, scheduling information, DL control signal, DL reference signal and short TTI configuration information). The received signal processing section 404 outputs the information received from the radio base station 10 to the control section 401. For example, the received signal processing section 404 outputs, to the control section 401, the broadcast information, system information, higher layer control information by higher layer signaling such as RRC signaling, physical layer control information (L1/L2 control information), and the like.

The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

Based on a reference signal (e.g., CSI-RS) from the radio base station 10, the measurement section 405 measures a channel state, and outputs the measurement result to the control section 401. In addition, measurement of the channel state may be performed for each CC.

The measurement section 405 is capable of being comprised of a signal processing device, signal processing circuit or signal processing apparatus and a measurement device, measurement circuit or measurement apparatus explained based on the common recognition in the technical field according to the present invention.

Hardware Configuration

In addition, the block diagrams used in explanation of the above-mentioned Embodiment illustrate blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 19:
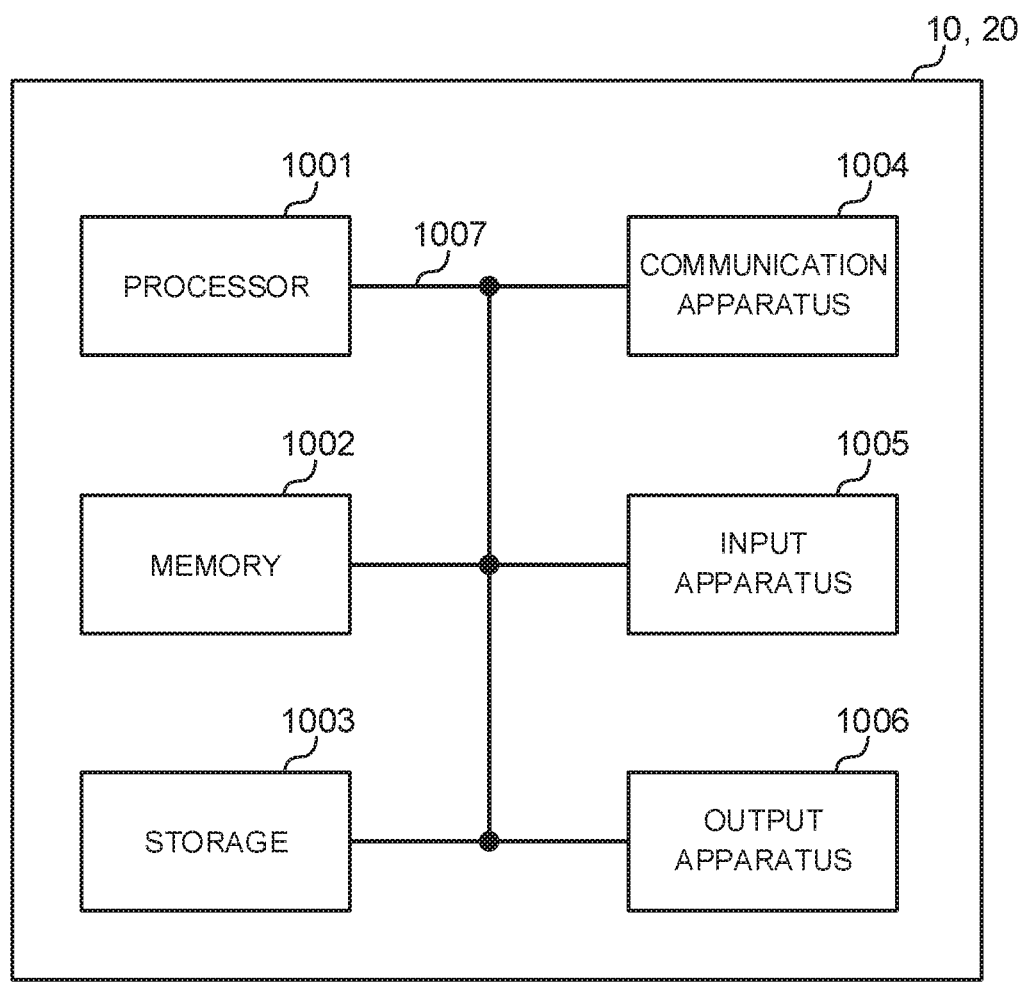
FIG. 19 is a diagram illustrating one example of hardware configurations of the radio base station and user terminal according to this Embodiment.

For example, each of the radio base station, user terminal and the like in one Embodiment of the present invention may function as a computer that performs the processing of the radio communication method of the present invention. FIG. 19 is a diagram illustrating one example of a hardware configuration of each of the radio base station and user terminal according to one Embodiment of the present invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus illustrated in the figure, the hardware configuration of each of the radio base station 10 and the user terminal 20 may be configured so as to include one or a plurality of apparatuses, or may be configured without including a part of apparatuses.

For example, a single processor 1001 is illustrated in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like.

For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

Modification

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time interval (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called shortened TTI, short TTI, partial or fractional TTI, shortened subframe, short subframe, mini-slot, subslot or the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subcarrier, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), resource element group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed by another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified by MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by an upper node thereof in some case. In a network comprised of one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., looking up in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access". In the case of using in the present Description, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2016-215715 filed on Nov. 2, 2016, entire content of which is expressly incorporated by reference herein.

The invention claimed is:

1. A terminal comprising:
   a receiver that receives information about numerologies; and
   a processor that controls, based on the information, at least one of an uplink signal transmission and a downlink signal reception using one of a plurality of numerologies, each of the plurality of numerologies corresponding to different subcarrier spacings and having a different number of symbols per subframe at the different subcarrier spacings,
   wherein the subframe is specified by a fundamental time unit based on a subcarrier spacing and a predetermined value,
   wherein the predetermined value is a single constant value that indicates a fixed Fast Fourier Transform (FFT) size, even when any of the different subcarrier spacings are used,
   wherein the different subcarrier spacings comprise 15 kHz, 30 kHz, 60 kHz, 120 kHz, and 240 kHz, and
   wherein the fundamental time unit is defined as 1/(the subcarrier spacing×the predetermined value).

2. The terminal according to claim 1, wherein a time length of the subframe is a fixed value regardless of the numerology and subcarrier spacing.

3. A radio communication method for a terminal comprising:
   receiving information about numerologies; and
   controlling, based on the information, at least one of an uplink signal transmission and a downlink signal reception using one of a plurality of numerologies, each of the plurality of numerologies corresponding to different subcarrier spacings and having a different number of symbols per subframe at the different subcarrier spacings,
   wherein the subframe is specified by a fundamental time unit based on a subcarrier spacing and a predetermined value,
   wherein the predetermined value is a single constant value that indicates a fixed Fast Fourier Transform (FFT) size, even when any of the different subcarrier spacings are used,
   wherein the different subcarrier spacings comprise 15 kHz, 30 kHz, 60 kHz, 120 kHz, and 240 kHz, and
   wherein the fundamental time unit is defined as 1/(the subcarrier spacing×the predetermined value).

4. A base station comprising:
   a transmitter and a receiver that communicate with a terminal; and
   a processor that transmits information about numerologies to the terminal via the transmitter and the receiver, wherein
   the terminal controls, based on the information, at least one of an uplink signal transmission and a downlink signal reception using one of a plurality of numerologies, each of the plurality of numerologies corresponding to different subcarrier spacings and having a different number of symbols per subframe at the different subcarrier spacings, the subframe is specified by a fundamental time unit based on a subcarrier spacing and a predetermined value, the predetermined value is a single constant value that indicates a fixed Fast Fourier Transform (FFT) size, even when any of the different subcarrier spacings are used, the different subcarrier spacings comprise 15 kHz, 30 kHz, 60 kHz, 120 kHz, and 240 kHz, and the fundamental time unit is defined as 1/(the subcarrier spacing×the predetermined value).

5. A system comprising a terminal and a base station, wherein:

the terminal comprises:
- a first receiver that receives information about numerologies; and
- a first processor that controls, based on the information, at least one of an uplink signal transmission and a downlink signal reception using one of a plurality of numerologies, each of the plurality of numerologies corresponding to different subcarrier spacings and having a different number of symbols per subframe at the different subcarrier spacings, wherein the subframe is specified by a fundamental time unit based on a subcarrier spacing and a predetermined value, wherein the predetermined value is a single constant value that indicates a fixed Fast Fourier Transform (FFT) size, even when any of the different subcarrier spacings are used, wherein the different subcarrier spacings comprise 15 kHz, 30 kHz, 60 kHz, 120 kHz, and 240 kHz, and wherein the fundamental time unit is defined as 1/(the subcarrier spacing×the predetermined value); and the base station comprises:
- a transmitter and a second receiver that communicate with the terminal; and
- a second processor that transmits the information about the numerologies to the terminal via the transmitter and the second receiver.

* * * * *